Dec. 4, 1956 R. C. JAYE 2,772,520
MACHINE FOR FORMING PIPE-FITTING COVERS
Filed May 6, 1955 3 Sheets-Sheet 1
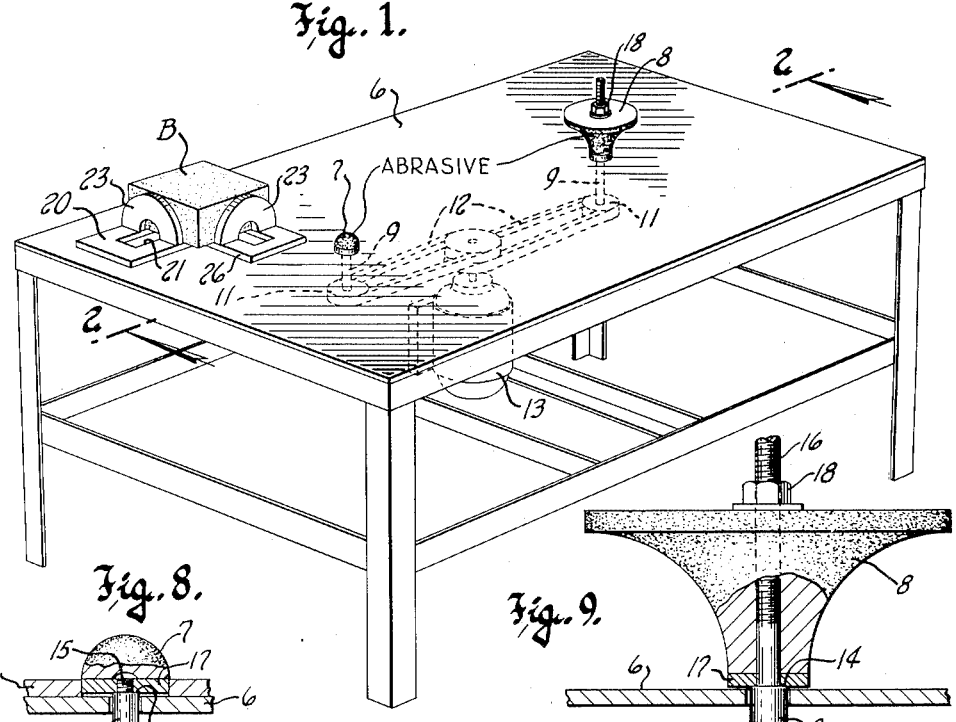
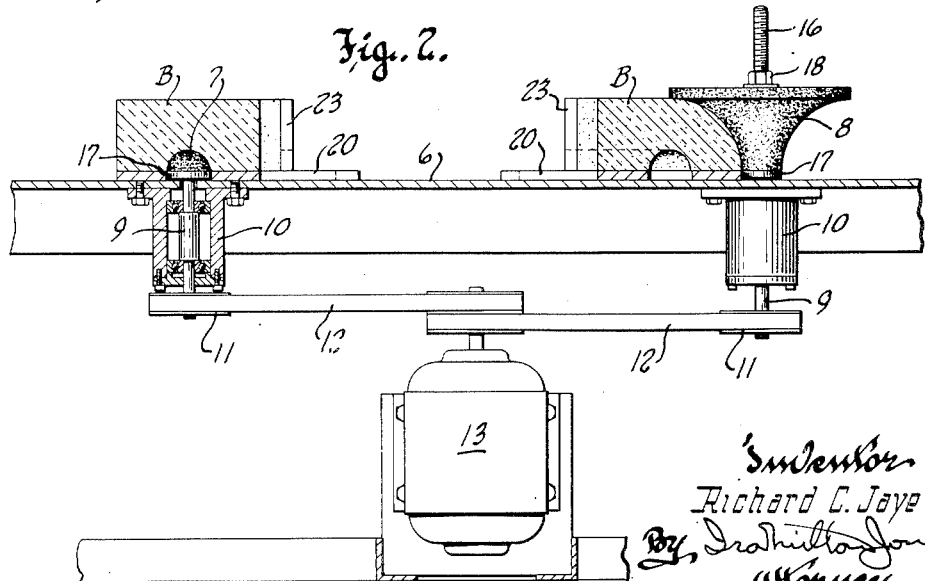

Dec. 4, 1956  R. C. JAYE  2,772,520
MACHINE FOR FORMING PIPE-FITTING COVERS
Filed May 6, 1955  3 Sheets-Sheet 2

Inventor
Richard C. Jaye
By Ira Milton Jones
Attorney

United States Patent Office 2,772,520
Patented Dec. 4, 1956

2,772,520

MACHINE FOR FORMING PIPE-FITTING COVERS

Richard C. Jaye, Watertown, Wis., assignor to The Jaye Corporation, Watertown, Wis., a corporation of Wisconsin Application May 6, 1955, Serial No. 506,645

3 Claims. (Cl. 51—100)

This invention relates to the manufacture of covers for pipe fittings, and refers more particularly to a machine for making such covers from cellular plastic material available upon the market under the trademark Styrofoam, and the cellular material made of glass and known as Foamglass. The product produced by the machine of this invention thus complements the pipe covering produced by the method and apparatus of the copending application of Richard C. Jaye, Serial No. 493,888, filed March 14, 1955.

Styrofoam and Foamglass have excellent thermal insulating properties and their lightness admirably adapts these materials to use as a pipe covering. Both materials are available in blocks and billets of various sizes and can be cut to any desired shape and configuration by most any sawing or abrading tool, but heretofore no suitable means was available for fabricating the material into pipe-fitting cover sections on a commercially economical basis. It is therefore, the purpose and object of this invention to provide a machine especially adapted to this purpose and with which complementary pipe-fitting cover sections may be quickly and easily fabricated or cut from Styrofoam or Foamglass.

Another object of this invention is to provide a machine for the purpose set forth which is quickly adaptable to the production of cover sections for pipe fittings of different sizes.

Another object of this invention is to provide a machine of the character described which may be employed to produce cover sections for any type of pipe fitting, merely by the provision of a suitable templet or work holder.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best mode so far devised for the practical application of the principles thereof, and in which:

Figure 1 is a perspective view of the machine of this invention;

Figure 2 is a vertical sectional view through Figure 1 on the plane of the line 2—2;

Figure 8 is an enlarged fragmentary sectional view through the cutter which forms the inside of the cover section and illustrating the manner in which the cutter is detachably mounted for quick replacement; and Figure 9 is a view similar to Figure 8 but illustrating the manner in which the cutter employed to shape the outside of the cover section, is detachably mounted.

Figure 3:
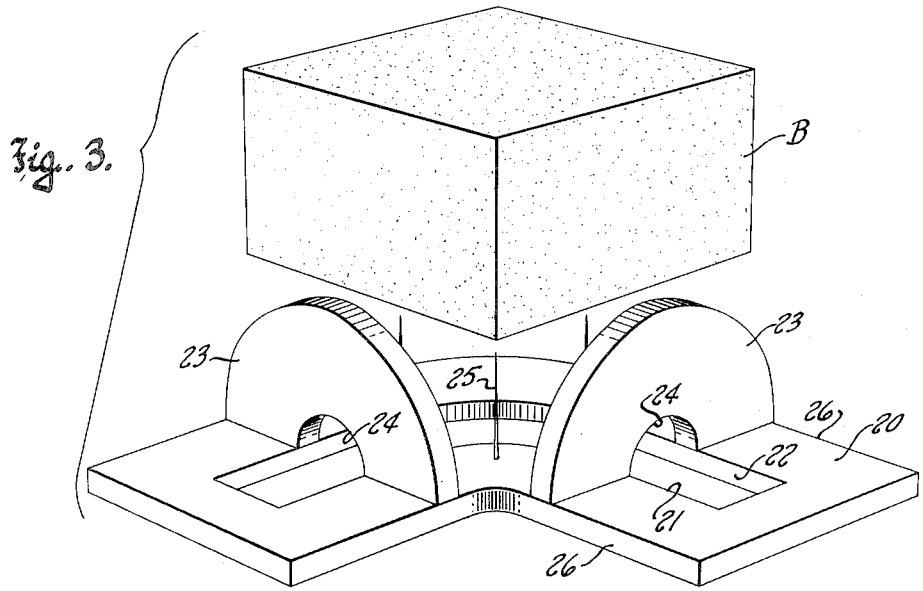
Figure 3 is a perspective view of a combined templet and work holder used in the formation of cover sections for elbows and illustrating a block of material about to be placed thereon.
Figure 4:
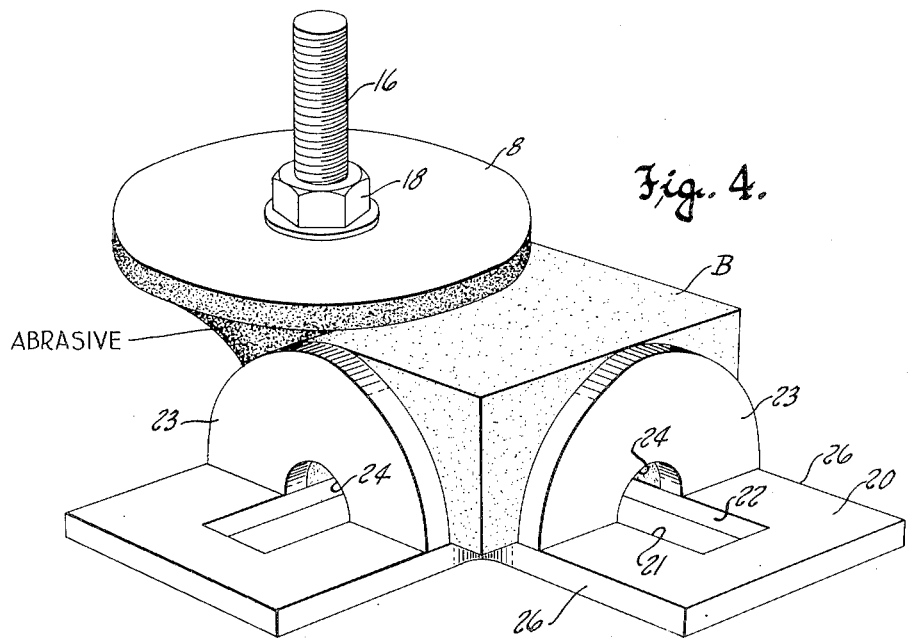
Figure 4 is a perspective view of the templet and block of Figure 3 properly assembled and illustrating the same in position during the shaping of the exterior of the cover section.
Figure 5:
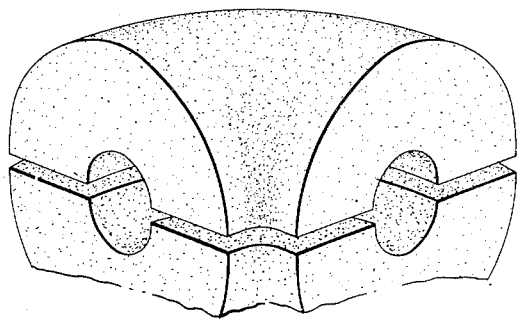
Figure 5 is a perspective view of a pair of mating complementary cover sections made upon the machine of this invention for use in covering an elbow.
Figure 6:
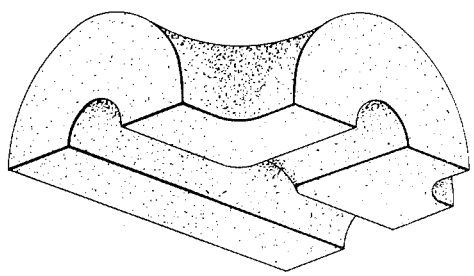
Figure 6 is a view of a T-fitting cover section made upon the machine of this invention.

Referring now particularly to the accompanying drawings, it will be seen that the machine of this invention comprises a table 6 suitably supported, an inside cutter 7, an outside cutter 8, and a number of combined templet and work holders, there being a separate templet and holder for each size and shape of fitting cover to be produced. By the same token, the cutters 7 and 8 are provided in pairs of different sizes.

Each cutter is mounted on a power driven spindle 9 journaled in a bearing structure 10 secured to the underside of the table, with the axis of the spindle vertical and its upper end passing through a hole in the table, to be exposed above the table. Pulleys 11 secured to the lower ends of the spindles and belts 12 drivingly connect the spindles with the drive shaft of a motor 13. In the embodiment of the invention illustrated, both spindles are driven from a single motor, so that the drive shaft of the motor has two driving pulleys. However, it will be readily understood that the cutters may be independently driven.

Since the cover sections for any given pipe fitting are identical and complementary so as to mate on a plane of junction coinciding with the median plane of the fitting, and since the inside of the cover preferably should conform as closely as possible to the exterior of the fitting, the inside cutter 7 has a hemispherical convex shape to form a round-bottomed groove in the cover section of a size and shape to snugly receive one-half of the fitting. The exterior of the cover, of course, could be of any desired configuration, but where the cover is intended to complement the pipe covering produced by the method and apparatus of the aforesaid copending application, the outer wall of the cover should be round, and accordingly, the outside cutter 8 has a concave cutting surface concentric to the curvature of the inside cutter 7.

The upper ends of the spindles 9, as best shown in Figures 8 and 9, are reduced in diameter to provide shoulders 14, at an elevation just slightly above the top surface of the table. For the inside cutter 7, the reduced diameter upper end of the spindle is merely a short threaded stud 15, but for the outside cutter 8, the reduced diameter upper end portion 16 of the spindle is long enough to pass entirely through the largest outside cutter that might be used.

Each cutter has a flat circular base 17, secured to the bottom of the cutter in any suitable way, but with the side wall or periphery of the base flush with the adjacent part of the cutter. The side of the base thus provides a smooth circular guiding surface for the cutter.

The specific construction of the cutters per se is, of course, subject to modification, but it has been found entirely satisfactory to make them of wood and cover the active surfaces thereof with abrasive particles such as Carborundum embedded in glue.

Both cutters are readily detachably secured to their respective spindles with the undersides of their bases seated upon the shoulders 14 so that the bottom of each cutter is always spaced a definite fixed distance above the top of the table. To so mount the inside cutter 7, its base 17 has a central threaded hole which is screwed onto the threaded stud 15. The larger outside cutter 8 is secured to its spindle by a clamping nut 18 threaded on the reduced upper end 16 of its spindle.

Figure 7:
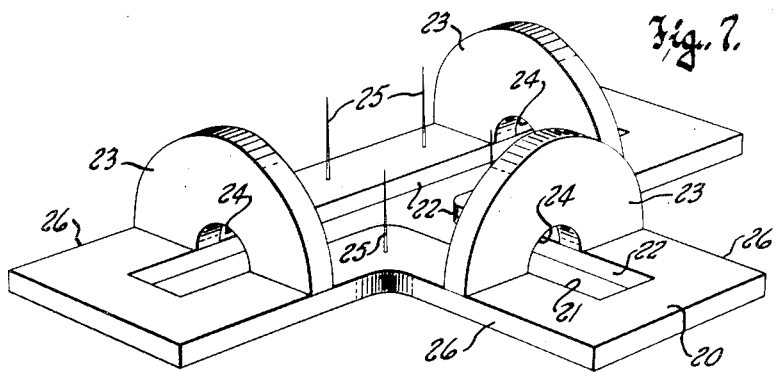
Figure 7 is a perspective view of the combined templet and work holder used to produce the cover section shown in Figure 6.

The combined templet and work holder 20, regardless of the type of fitting to which it corresponds, that is, whether for an elbow, T, or other fitting, consists of a flat piece of plywood or the like of a shape corresponding to that of the type of fitting for which it is intended. Thus, for an elbow cover section, the templet and work holder is in the shape of an elbow, as shown in Figure 3, and for a T-fitting cover section, the combined templet and work holder has a T-shaped configuration as shown in Figure 7. In each instance, the combined templet and work holder has a uniform thickness not less than and preferably substantially the same as the perpendicular distance from the surface of the table to the level of the top edge of the cutter bases 17 which is also the bottom of the cutters. Hence, when a templet and work holder is in position on the table, a block of material B positioned thereon, will have its underside at an elevation coinciding with the bottom of the cutters, or at least not below this level.

Each templet and work holder has a slot 21 therein of a width slightly greater than the outside diameter of a pipe fitting of the size and type for which the templet and work holder is intended. The sides 22 of this slot provide inner guide edges engageable with the smooth side wall or periphery of the cutter base 17 of the inside cutter 7 to thereby guide its cutting action and cause a groove of the proper size and shape to be cut in the underside of a block of material mounted on the templet and work holder as the latter is moved across the cutter.

To properly locate the block of material thereon, the templet and work holder has upstanding abutments or fences 23 against which the adjacent side faces of the block engage. For the elbow fittings there are two such abutments or fences disposed at right angles to one another and for the T-fittings, three abutments or fences are provided. In every case, though, the abutments or fences extend across the end portions of the slot 22, inwardly of the extremities of the slot and are cut out, as at 24, to enable the cutter 7 to pass through. Accordingly, the groove cut into a block of material properly positioned on the templet and work holder may extend to and through the side faces of the block engaged with the abutments or fences.

Any suitable means may be provided to secure the block against displacement from its intended position on the templet and work holder, as for instance a number of sharp pins 25 rising from the templet and work holder, and upon which the block of material may be impaled. For convenience in locating the block upon the templet and work holder, its abutments or fences 23 should rise above the points of the pins so that the block can be properly placed without interference from the pins.

The abutments or fences 23 not only serve to properly locate the block, but in addition, since they have the same shape as the cross section of the cover section to be produced, they support the block against breaking off as the cutter breaks through the adjacent face of the block. This is so, both during the formation of the inside of the cover section by the cutter 7, and during the shaping of the outside of the cover section by the other cutter 8.

In shaping the outside of the cover section, the necessary guidance is obtained by the engagement of the outer edges 26 of the templet and work holder against the side of the base 17 of the outside cutter 8, it being understood that first one side and then the other of the templet and work holder with the block of material thereon, is moved past the cutter.

From the foregoing description taken in connection with the accompanying drawings, it will be readily apparent to those skilled in this art that the present invention provides a machine which is very well adapted to the fabrication of pipe-fitting cover sections from cellular material such as Styrofoam and Foamglass.

I claim:

1. A machine for making complementary pipe fitting cover sections, which sections are adapted to mate on a plane of junction coinciding with the median plane of the fitting when the sections are in position on the fitting, comprising: a table; a power driven rotary cutter; means mounting the cutter for rotation about an axis perpendicular to the table with the cutter disposed above the table, said means including a circular base against the top of which the underside of the cutter abuts, and by which the cutter is spaced a definite distance above the surface of the table, said base having a smooth circular periphery; a combined templet and work holder, said templet and work holder being flat and of a thickness not less than the perpendicular distance from the upper outer edge of the circular base to the surface of the table; means on the combined templet and work holder for locating and holding a block of material thereon with the bottom of the block flat against the top of the templet and work holder; said combined templet and work holder having a slot formed therein of a size and shape corresponding to that of the pipe fitting contemplated and of a width sufficient to receive the cutter base, the sides of said slot providing guide edges engageable with the side of the cutter base and extending at least up to said means for locating and holding the block of material, said slot having continuations which extend outwardly beyond said means for locating and holding the block of material so that the cutter may be optionally engaged in or disengaged from the extended end portions of the slot, outwardly of the block of material on the combined templet and work holder; and the cutter being shaped to form a groove in the underside of the block of a size to receive one half of the fitting therein.

2. The machine of claim 1 further characterized by the fact that the means for locating and holding the block of material on the combined templet and work holder includes locating abutments projecting from the top of the templet and work holder and extending across the slot inwardly of the ends thereof, for engagement with said faces of the block to be cut, said locating abutments being cut out to accommodate the cutter so that the cutter may be passed through the locating abutments, and the groove formed by the cutter in a block of material in position on the templet and work holder may be continued to and through said side faces of the block.

3. The machine of claim 1 further characterized by the fact that the combined templet and work holder has outer side edges equispaced from the sides of the slot to provide another set of guide edges by which shaping of the exterior of the cover sections may be guided to assure a predetermined relationship between the interior and exterior of the cover sections.

References Cited in the file of this patent

UNITED STATES PATENTS

| 230,157 | Sutherland | July 20, 1880 |
| 660,642 | Keyes | Oct. 30, 1900 |
| 795,552 | Sheets | July 25, 1905 |
| 1,196,420 | Barnes | Aug. 29, 1916 |
| 1,769,143 | Koskinen | July 1, 1930 |
| 1,905,190 | Silvester | Apr. 25, 1933 |
| 2,314,541 | Hyland et al. | Mar. 23, 1943 |
| 2,365,302 | Shutt et al. | Dec. 19, 1944 |